No. 12,355. REISSUED JUNE 13, 1905.

E. M. ADAMS.

BOILER TUBE CLEANER.

APPLICATION FILED DEC. 11, 1903.

WITNESSES

L. A. Somers

J. M. Comin

INVENTOR

E. M. Adams by Bakewell & Byrnes his attys

No. 12,355. Reissued June 13, 1905.

UNITED STATES PATENT OFFICE.

EDWARD M. ADAMS, OF AKRON, OHIO, ASSIGNOR TO LIBERTY MANUFACTURING COMPANY, OF PITTSBURG, PENNSYLVANIA, A CORPORATION OF PENNSYLVANIA.

BOILER-TUBE CLEANER.

SPECIFICATION forming part of Reissued Letters Patent No. 12,355, dated June 13, 1905.

Original No. 725,018, dated April 14, 1903. Application for reissue filed December 11, 1903. Serial No. 184,839.

*To all whom it may concern:*

Be it known that I, EDWARD M. ADAMS, a citizen of the United States, residing at Akron, in the county of Summit and State of Ohio, have invented certain new and useful Improvements in Boiler-Tube Cleaners, of which the following is a specification.

This invention relates to turbine-cleaners for tubes and flues of boilers for removing all scale and incrustation by a cutting and a pounding action, the latter operation loosening the scale and breaking it up, so as to facilitate its removal by the blast of steam or other medium passing through the tube or flue.

In accordance with this invention the arm carrying the cleaner-tool is adapted to be rotated and is connected with the driver by a universal joint, so as to oscillate in all directions and permit the cleaner-tool to strike every point of the boiler-tube within its range.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1:
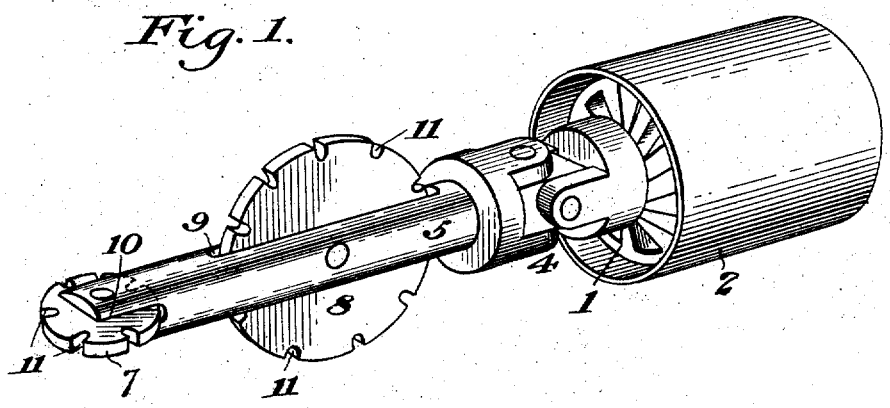
Figure 2:
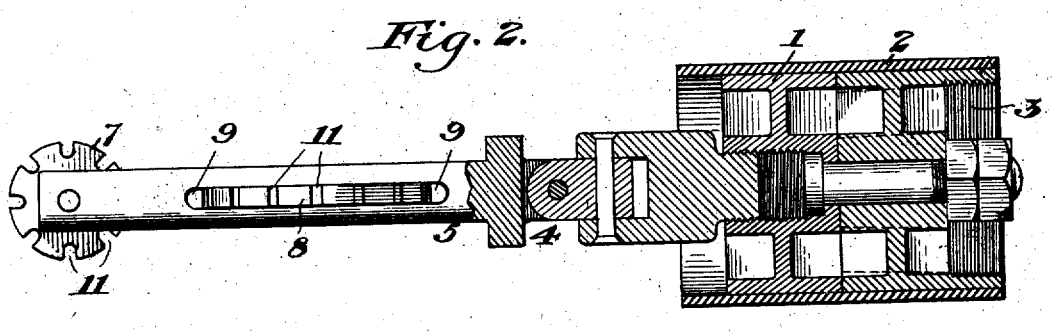
Figure 3:
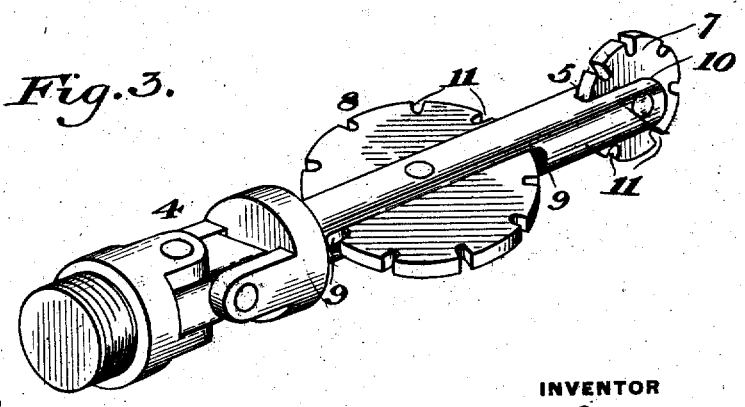

Figure 1 is a perspective view of a boiler-tube cleaner of the turbine type embodying the invention. Fig. 2 is a central longitudinal section thereof. Fig. 3 is a perspective view of the arm and universal joint detached from the driver.

Corresponding and like parts are referred to in the following description and indicated in all the views of the drawings by the same reference characters.

The invention is particularly designed for use in connection with a driver or operating means of the turbine type, although it is to be understood that it may be applied to cleaners rotated in any manner.

As shown in the drawings, the driver consists of a turbine or motor wheel 1, which is located within a casing 2, to which the steam or other motive medium is adapted to be supplied in the well-known manner. A curb 3 is secured within the casing 2 and is provided with a plurality of inclined ways or passages for directing steam or motive agent to the buckets or flights of the turbine or motor wheel in a series of jets, whereby the best results are attained.

The cleaner proper is coupled to the turbine, motor-wheel, or driver 1, so as to rotate therewith, a universal joint being provided in its length to admit of the arm carrying the cleaner-tools oscillating in every direction. The cleaner comprises, essentially, a coupling end 4, arm 5, gimbal 6, and cleaner-tools 7 and 8. The coupling end 4 is adapted to be attached to the driver in any substantial way, and the arm 5 is coupled thereto by a universal joint to admit of lateral oscillation of said arm in every direction to permit the cleaner-tools 7 and 8 to come in contact with every part of the boiler-tube within their range. A longitudinal slot 9 is provided in the arm 5 to receive the cleaner-tool 8, and a second slot 10 is formed at the outer end of said arm to receive the cleaner-tool 7. These slots 9 and 10 are disposed at a right angle to each other, consequently giving the cleaner-tools a right-angular disposition. This relation of the cleaner-tools is essential in order to secure the best results in the operation of the machine, as it insures the striking of one or other of the tools against the side of the boiler-tube being operated upon.

The cleaner-tools 7 and 8 are of like construction, being disks having transverse notches at intervals in their periphery, so as to form, in effect, square teeth 11. The cleaner-tools are formed from best tool-steel, highly tempered, or may be case-hardened or otherwise constructed so as to resist wear and prevent a too rapid wearing away of the cutting edges. The outer cleaner-tool 7 is smaller than the inner cleaner-tool 8, this being necessary to admit of said tool operating effectively against the inner side of the boiler-tube.

The cleaner-tools are centrally disposed with reference to the arm 5 and are rotatably mounted upon pins extended across the respective slots 9 and 10. By having the cleaner-tools rotatably mounted they are adapted to turn so as to bring new portions or teeth into position for operation.

The cleaner in operation is advanced within the boiler-tube in the well-known manner and is rotated by means of the driver, which in the present instance is the turbine or motor wheel 1, driven by means of steam, compressed air, or other motive medium. As the cleaner is rapidly rotated the arm 5 oscillates and causes the cleaner-tools to strike against the walls or inner sides of the boiler-tube, thereby loosening and detaching the scale and incrustation, the same being carried off by the blast escaping from the turbine or motor wheel. As the arm 5 rotates and simultaneously oscillates the cleaner-tools are brought into contact with every part of the tube within their range, the machine being advanced to its work as the scale is removed.

Having thus described the invention, what is claimed as new is—

1. A boiler-tube cleaner comprising a tool composed of an arm having a longitudinal slot midway of its ends and an open slot at its outer end disposed at a right angle to the first-mentioned slot, disk cleaners journaled in the said slots and having transverse notches in their peripheries, the outer disk being of less diameter than the inner, a driver and means for rotating the same, and a universal joint connecting the said tool with said driver.

2. In a boiler-tube cleaner a vibratory cleaner-arm, a shaft having universal-joint connection with said arm, a plurality of rotary cleaner-wheels pivoted in slots in the arm, and lying in planes substantially parallel with the axis of the arm, the peripheries of said wheels constituting the working surfaces of the arm, and means for rotating said shaft and arm at high speed to cause vibration of the arm under centrifugal force; substantially as described.

3. A boiler-tube cleaner comprising a loose vibratory arm, a shaft connected thereto by a universal joint, rotary cleaning-disks pivoted in slots in the arm, each of said disks projecting beyond the arm on both sides and lying in a plane longitudinal of the arm, and means for rotating the shaft and arm at high speed to cause vibration of the arm under centrifugal force; substantially as described.

In testimony whereof I have hereunto set my hand.

E. M. ADAMS.

Witnesses:
J. B. Huber,
J. B. Pell.